United States Patent [19]

Miller, III

[11] Patent Number: 4,670,289
[45] Date of Patent: Jun. 2, 1987

[54] TIRE MARKER

[75] Inventor: Nick M. Miller, III, Rootstown, Ohio

[73] Assignee: The Firestone Tire & Rubber Company, Akron, Ohio

[21] Appl. No.: 706,998

[22] Filed: Feb. 28, 1985

[51] Int. Cl.⁴ .............................................. B05B 12/02
[52] U.S. Cl. ........................................ 427/8; 118/669;
118/670; 118/703; 118/712; 118/320; 427/425;
427/10; 73/146
[58] Field of Search ............... 118/669, 670, 684, 703,
118/712, 320; 73/146, 460, 461; 427/8, 10, 425

[56] References Cited

U.S. PATENT DOCUMENTS

| | | | |
|---|---|---|---|
| 1,700,697 | 1/1929 | Draper | 118/320 X |
| 3,500,681 | 3/1970 | Shively | 73/146 X |
| 3,518,878 | 7/1970 | Landsness et al. | 73/146 |
| 3,526,131 | 9/1970 | Buser et al. | 73/146 |
| 3,631,716 | 1/1972 | Monajjem | 73/146 |
| 3,865,073 | 2/1975 | Jahn | 118/669 |
| 3,911,739 | 10/1975 | Murata et al. | 73/146 |
| 3,996,883 | 12/1976 | Gusarov et al. | 118/669 |
| 4,078,339 | 3/1978 | Ongaro | 73/146 X |
| 4,308,747 | 1/1982 | Reed | 73/146 |
| 4,359,897 | 11/1982 | Ugo | 118/669 |
| 4,440,018 | 4/1984 | Christie | 73/146 |

Primary Examiner—Shrive P. Beck
Attorney, Agent, or Firm—Ronald Brietkrenz

[57] ABSTRACT

A marking device used in conjunction with a tire inspection machine in order to allow a tire to be marked at the location of irregularities detected by the tire inspection means.

15 Claims, 4 Drawing Figures

TIRE MARKER

BACKGROUND OF THE INVENTION

1. Field of the Invention

This invention relates to a marking device and more particularly to a marking device adapted to mark tires. Specifically, the instant invention relates to a tire marking device used in conjunction with a tire inspection machine in order to allow the tire to be marked at the location of irregularities detected by the tire inspection means. The instant invention employs means for receiving a signal indicative of the location of an irregularity in the tire being inspected and subsequently causing a paint to be applied to the tire in proximity to the irregularity detected by the tire inspection machine.

2. Description of the Prior Art

Means for marking tires are known in the art as disclosed by U.S. Pat. No. 3,518,878 to Landsness, et al which discloses an apparatus for making a mark on a rotating tire at the location corresponding to the place of maximum of the fundamental frequency of the radial force variation comprising an arcuately oscillable marker mounted on a shaft having an acuator operatively connected to the shaft for rotating the marker to contact the sidewall of the tire. Rollers contacting the sidewall of the tire support of the apparatus on the rotating tire.

U.S. Pat. No. 3,526,131 to Buser, et al relates to an apparatus for marking the location on a tire of the first harmonic. The apparatus employs a heated branding iron which is automatically dipped in wax and pressed against a tire at the location to be marked. The branding iron is moved to and from the tire by a pneumatic actuator cylinder, which in turn is controlled by an electronic control circuit which operates in response to force variation readings taken around the circumference of a tire by a conventional force variation measurement machine. The heated branding iron makes a permanent indentation on the tire and simultaneously deposits a wax ring around the indentation to make it more readily visible.

U.S. Pat. No. 3,631,716 to Monajjem relates to a marking device used to mark a rotating tire to indicate the location at which a given force variation is generated. As the tire is rotated against the load drum of a uniformity machine, the point on the tire at which this force variation is produced passes beneath the marker at which time a solenoid is activated to abruptly move the marker to mark the tire with a suitable marking fluid such as ink. The abrupt movement of the marker causes it to eject a small amount of marking fluid and to deposit the fluid on the tire sidewall. The marker solenoid is operated by a relay circuit activated by a signal from the tire uniformity machine.

U.S. Pat. No. 3,911,739 to Murata, et al relates to a marking device which comprises a rotary shaft, a first disc member securely mounted on the rotary shaft and carrying a marking means; a second disc freely rotatably mounted on the rotary shaft and adapted to be brought into pressing contact with a tire surface for rotation therewith, and a mechanism for transmitting rotatinal movement of the second disc member to the first disc member through the rotary shaft upon receipt of a signal from the measuring device for running the marking means at a speed same as the circumferential speed of the rotating tire. The apparatus further includes a means for holding the marking means in a standby position.

U.S. Pat. No. 4,308,747 to Reed is directed to a tire marking device comprising a tubular housing carried by a rotatable shaft which receives a marking fluid that is dispensed at the lower end thereof by a spring-loaded ball that is depressed by contact with the tire sidewall. The shaft is rotated to move the ball into contact with the tire in response to the sensor sensing the radial first harmonic high point on the tire with rotation of the shaft being synchronized with movement of the tire so that the radial first harmonic high point of the tire corresponds with the point of contact with the ball with the tire.

U.S. Pat. No. 4,440,018 to Christie is directed to a tire testing machine which measures lateral runout of the tire sidewalls. The resulting data is converted to digital form and analyzed by groups in order to increase the accuracy by which unacceptable sidewalls are detected. The device employs contact type sensors to sense variations in the sidewalls of the tire. The apparatus also provides means for marking the tire utilizing eight separate stamping plates supplied with ink and actuated by each solenoid which are capable of depressing individual plates into contact with the tire thereby providing a means for providing 28 different patterns of marks which can be placed on the tire.

It is common practice in the tire industry to inspect tire sidewalls especially mono-ply tire sidewalls for bulges and depressions. There is a general trend in the tire industry towards increased use of mono-ply tires for use in certain applications. However, due to the mono-ply construction of these tires, certain problems have arisen which evolve from irregularities in the ply splice at the sidewall of a mono-ply tire. If the splice is other than a flush butt fit, the sidewall at the splice may exhibit undesired characteristics. For example, if the splice is lapped, the sidewall becomes exceptionally strong at that point being effectively a double ply at the splice. When inflated the sidewall at the lap splice may not expand to the same degree as the sidewall as a whole, thus generating a deformation commonly referred to as a depression. While this depression is an indication of exceptional strength at that point of the sidewall, the presence of the depression is considered by the consuming public to be unsightly and thus undesirable. In the case of an open splice, the sidewalls may be weakened such that when inflated the weakened area at the splice will excessively expand to cause what is commonly referred to as a bulge. Such a bulge may be an indication of a weakened area in the sidewall and may also be considered unsightly if excessive. Bulges may also be created by a reduced cord count in a localized area.

It is a common practice in the tire industry to reinspect tires with bulges and/or depressions for structural integrity and appearance. The reinspection of both tire sidewalls in their entirety is required if the location of the bulges and/or depressions are not known.

There is, therefore, a need for an apparatus which is adapted to mark the actual locations of the bulges and/or depressions located in the sidewalls of the tires which apparatus is suitable for use in conjunction with tire production machinery wherein the apparatus is not required to contact the tire during the detection or marking of such tire and that such detection and marking may be accomplished in a relatively short time period. The instant invention provides such an apparatus for the precise marking of tire sidewalls using an apparatus suitable for tire production machinery.

SUMMARY OF THE INVENTION

The present invention relates to a means for marking the actual locations on a tire sidewall where bulges or depressions occur, employing a means for spraying an ink on the tire sidewall at the location of such bulges or depressions.

DESCRIPTION OF AN EXEMPLARY EMBODIMENT

Figure 1:
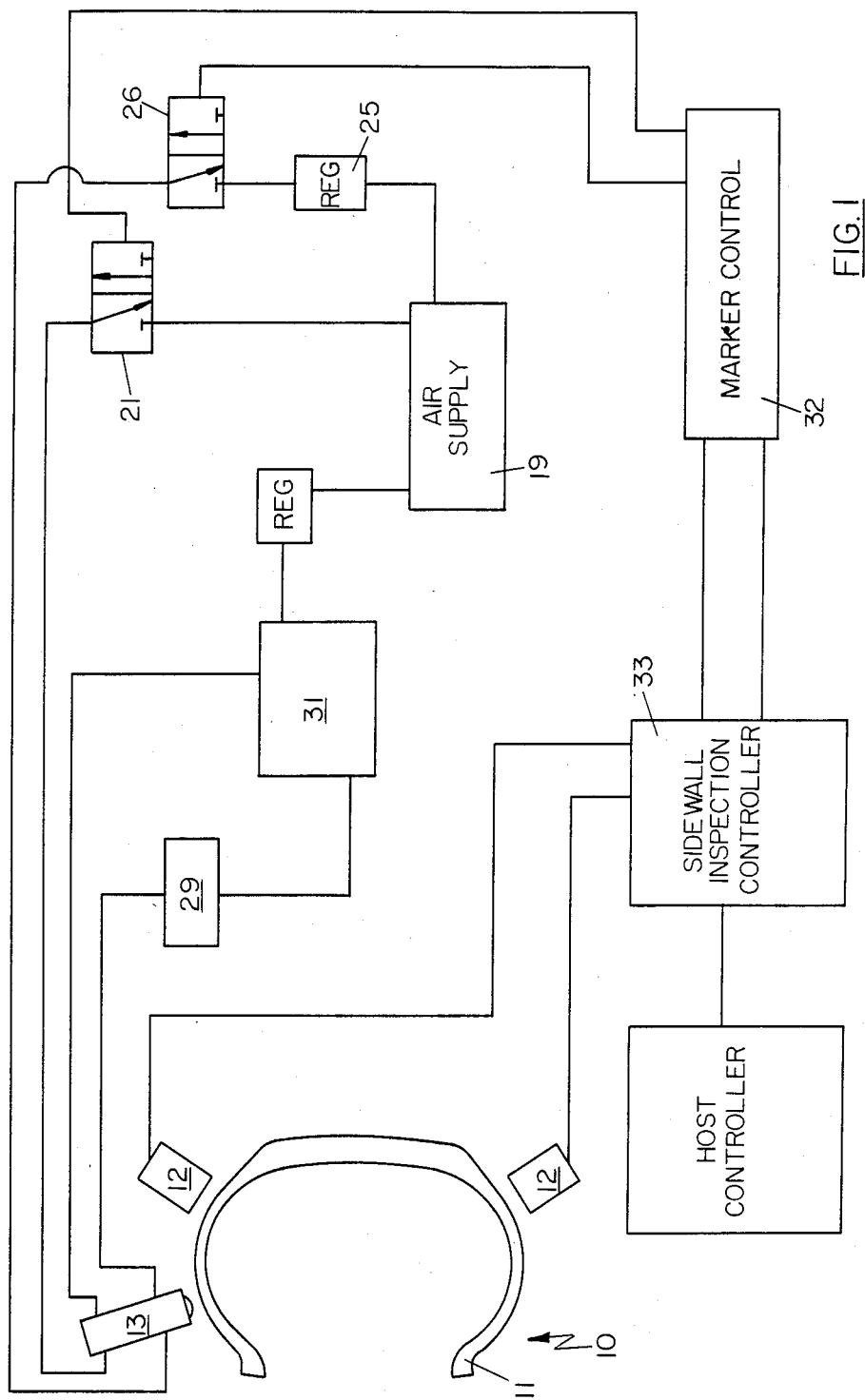
FIG. 1 is a schematic representation of the apparatus of the instant invention.

Referring now to FIG. 1 of the drawings, there is disclosed a simplified schematic drawing illustrating the instant invention. The instant invention is adapted to be used in conjunction with a tire sidewall deformity tester such as that disclosed in U.S. Pat. No. 4,258,567 to Fisher III, which patent is incorporated herein by reference.

Typically, a tire 11 as shown in FIG. 1 of the drawings is mounted in a tire uniformity optimizer (TUO) in order to provide a means for rotating the tire about an axis to facilitate inspection of the tire. Mounted in proximity thereto and displaceable about the tire sidewalls are sensors 12 adapted to detect irregularities in the contour of the sidewalls of the tire. The sensors 12 may be of a type disclosed in U.S. Pat. No. 4,258,567 or may include other types of sensors including lasers. The sensors 12 may be movably mounted with respect to the tire 11 to facilitate mounting of the tire 11 within the TUO 10.

Also mounted in proximity to the tire sidewalls of the tire 11 is marking unit 13 which, as discussed in more detail below, is adapted to apply a marking substance to the tire sidewall. The marking unit 13, may also be movably mounted with respect to the tire 11 in order to facilitate mounting of the tire 11 within the TUO 10. It should be appreciated, for reasons discussed in more detail below, that the sensors 12 and the marking units 13 do not necessarily need to be mounted adjacent to each other. However, it is important that the angular displacement between the sensors 12 and marking unit 13 remain constant.

The marking unit 13 is, in the exemplary embodiment, comprised of a model DS-10 Micro-Mini Marker produced by Del Products, 625 Wanda, Ferndale, Michigan 48220, which is a non-contact color marker employing an independent atomizing air source to provide a quick response time for the marking process. The marking fluid is fed to the marking unit 13 by a pressurized ink feed system. The marker is an atomizing spray type, and a water-based ink is employed in the exemplary embodiment.

The marking unit 13 may selectively receive an input of an air supply from control valve 21 which selectively ports 80 psi air from air supply 19 through control valve 21 to the marking unit 13 in order to activate a cylinder within the marker which allows pressurized ink to flow through the marker orifice and thus be applied to the tire sidewall. The marker 13 only allows the pressurized ink to be applied to the sidewall of the tire when air pressure is supplied to the cylinder within the marker unit 13.

A second source of air pressure from air supply 19 is through regulator 25 and valve 26, which valve may be selectively actuated to either allow or restrict air flow through valve 26 to the marking unit 13 in order to provide air flow around an air cap on the marker face which atomizes any ink flowing through the orifice of the marker unit 13.

It can thus be appreciated that there are provided means for selectively providing an air flow to the marker unit 13 which air flow allows pressurized ink to flow through an orifice in the marker and there is additionally provided to the marker unit 13 a second air flow which is employed in conjunction with an air cap on the marker face which atomizes the ink that is allowed to pass through the orifice, thereby providing a means whereby the marker unit 13 may be employed to selectively cause atomized ink to be expelled therefrom.

There is also associated with the marking unit 13 a circulating pump 29 that is employed to cause ink to be circulated from an ink reservoir 31 to the marker unit 13 and then returned to the reservoir 31 for further recirculation. The recirculation of the ink helps to prevent solid material in the ink from setting, assures that a supply of ink will always be at the marker and also automatically purges the lines of trapped air.

The operation of the solenoid actuated valves is governed by the marker control 32 which in turn receives the inputs from the Sidewall Inspection Controller 33.

Figure 2:
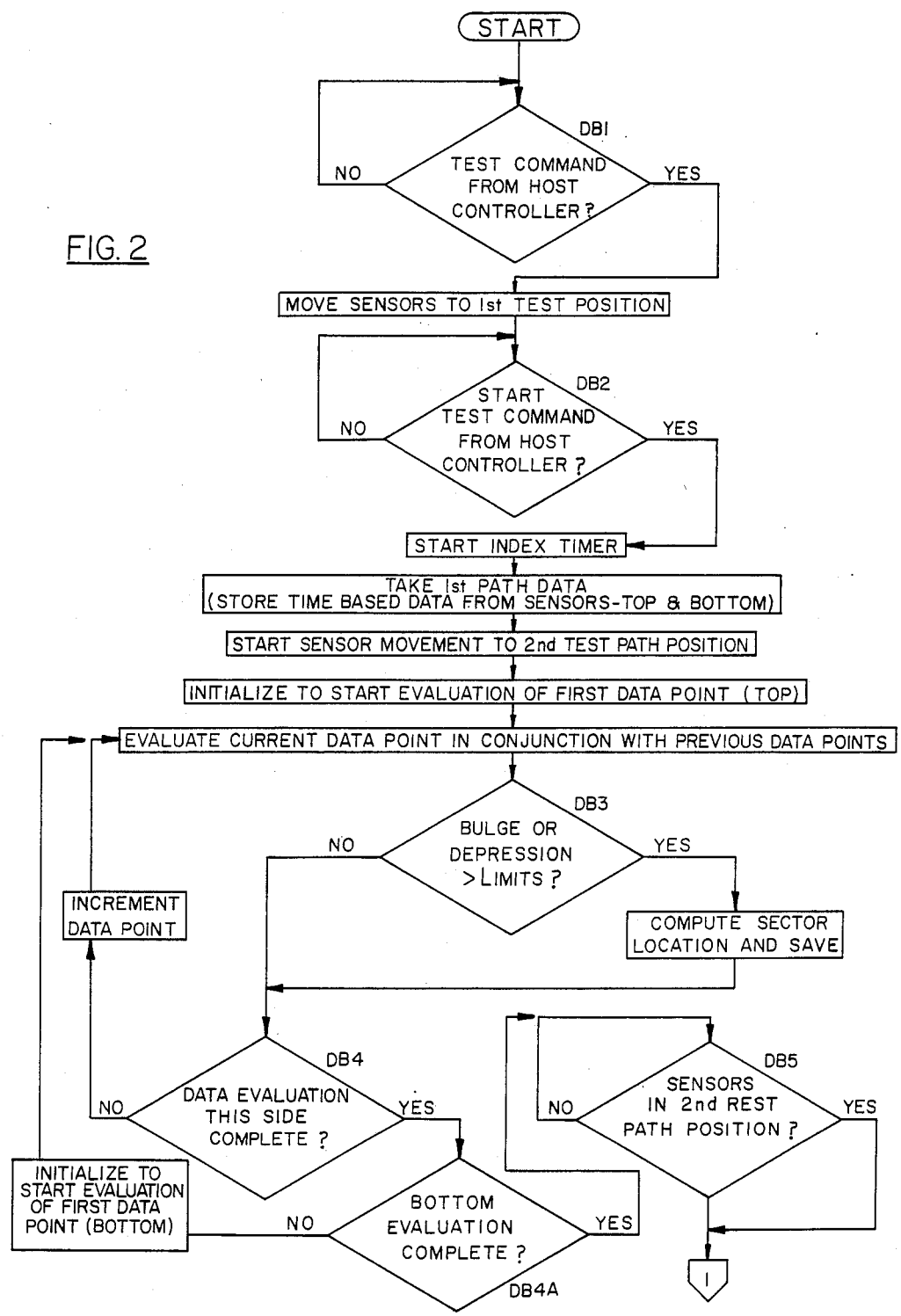
FIGS. 2 through 4 are schematic block diagrams disclosing the operation of the instant invention.
Figure 3:
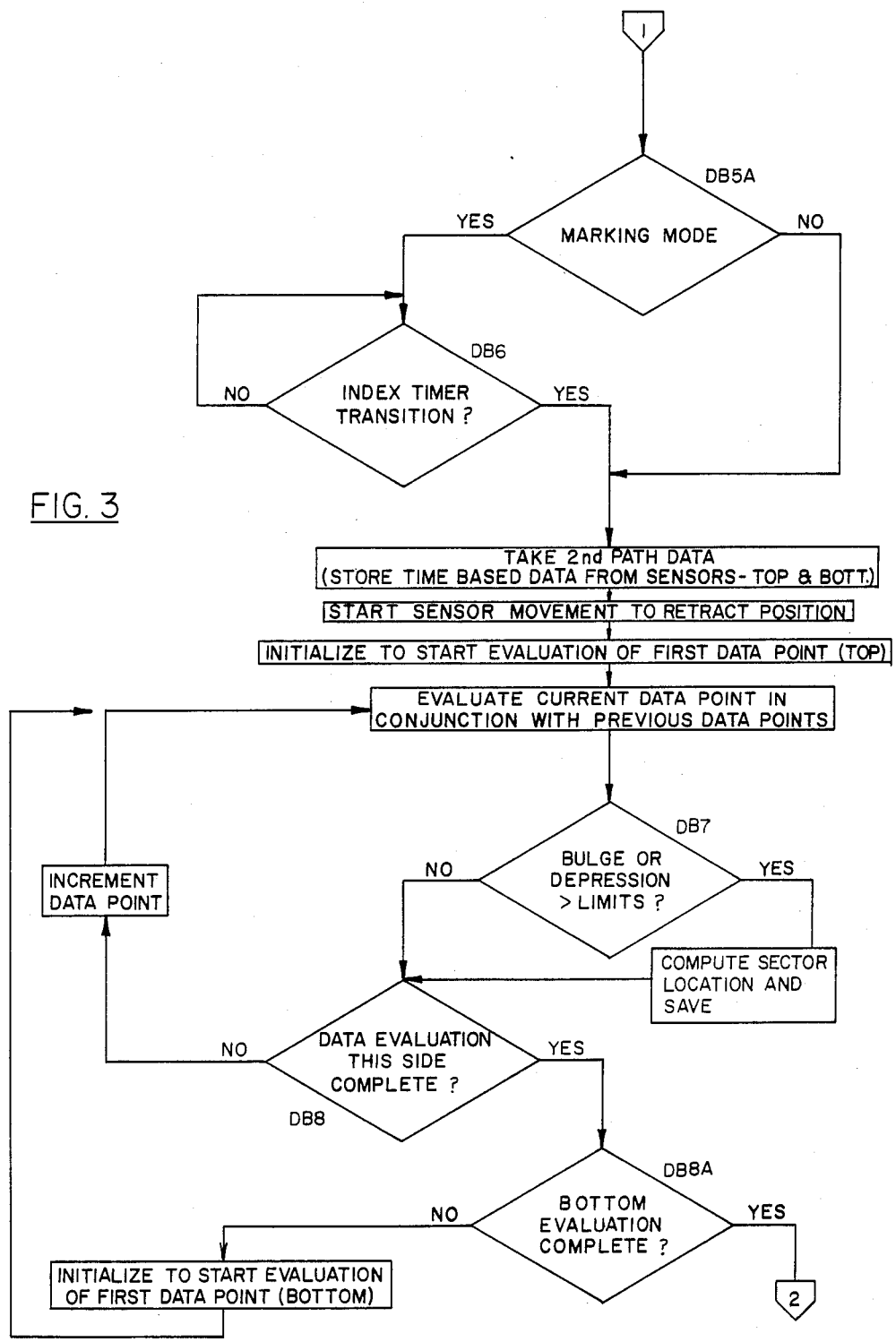
Figure 4:
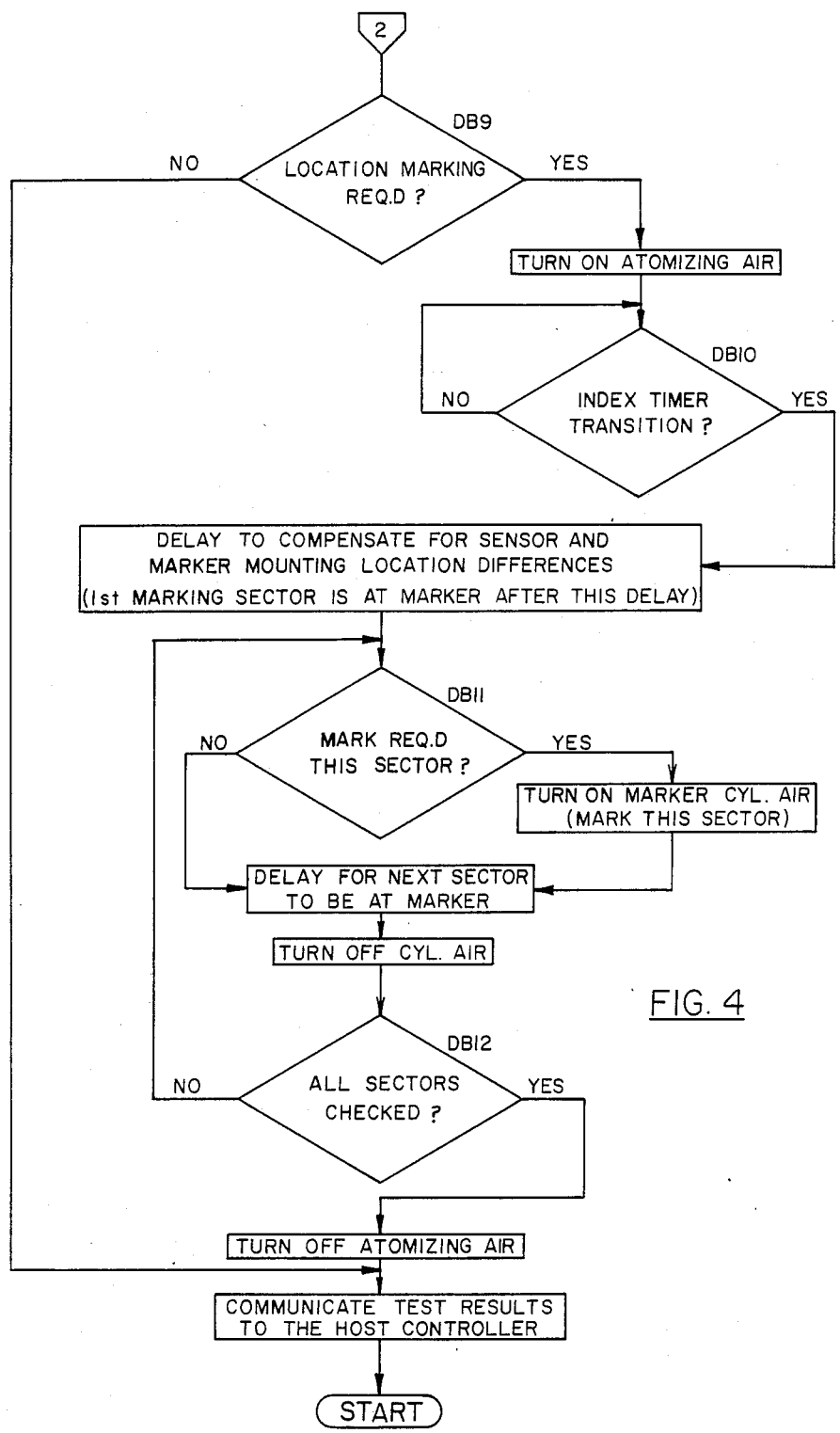

In operation, as disclosed in detail in FIGS. 2 through 4 of the drawings, at the start of the first path test cycle, a one-second timer reference is started which is used as an index of tire rotational position until after the tire is marked. In the exemplary embodiment the TUO spindle drive is comprised of an 1800 rpm synchronous motor, a 19.5 to 1 gearbox and a 40 to 26 timing pulley ratio from the gearbox to the spindle in order to provide the appropriate rotation of the tire in order that the instant invention may employ a marking means which is time based. In the exemplary embodiment the rotation of the tire is 60 revolutions per minute.

Thus the tire sidewall inspection system relates time to position with one second being one complete revolution of the tire. The tire sidewall inspection system starts both tests at the one second index positions and remembers irregularity locations by remembering the time between the one second index reference and the time that the irregularity location data was taken.

In a typical operating sequence for the instant invention, the tire is rotated until the one second index reference has been reached. There is then a delay of a fixed amount of time to compensate for the angular displacement between the sensor 12 in the marking unit 13. There is a further delay introduced corresponding to the time difference between the index point and the time that the reject location data was taken during the test. After these two delays, the marking unit 13 is energized to cause the pressurized ink to be applied to the tire sidewall at a position which corresponds to the actual location of the irregularities detected by the tire sidewall inspection system.

Referring now to FIGS. 2 through 4 of the drawings, there is disclosed a schematic block diagram showing the sequence of operation of the instant invention.

The flow chart begins with decision block DB1 where the Sidewall Inspection Controller (SIC) 33 is waiting for a command from the Host Controller to test a tire. At this point, the sensors 12 are retracted. The Host Controller controls the tire testing machine which tests tires for many other variables in addition to sidewall bulges and depressions. When a test command is received by the SIC, the SIC positions its sensors to a first sidewall test path. The SIC now waits for a start test command (DB2) from the Host Controller to commence the test. This prevents the SIC from taking the data prior to the tire being fully inflated, rotating, etc.

After the start test command has been received, the SIC starts a software index timer which is coincident with the time for the tire to rotate one revolution. This timer will remain on until after marking is complete. After the index timer is started, the SIC takes time based data (using a second software timer) from the sensors for a given period of time which results in a given number of evenly spaced data points for each tire revolution (both top and bottom) plus a given number of overlap data points. This data is stored in memory for later analysis.

The servo controller is now told to position the sensors 12 at the second test path position. While the sensors are being re-positioned, the first path test data in memory is evaluated for bulges and depressions that exceed limits. The evaluation is sequential in nature and includes decision blocks DB3, DB4 and DB4A in the flow chart. If a bulge or depression is found that exceeds limits (DB3), its sector location is computed and saved for later marking. The data (both top and bottom of the tire) is sequentially evaluated until all data is evaluated (DB4A).

Computation of sectors to be marked, if required, consists of taking the data point number that comprises the approximate center of the bulge or depression and dividing by a constant and truncating any remainder, e.g., if there were 1024 data points and the divisor constant were 8, there would be a possible 128 sectors, and if the data point that comprised the center of the bulge or depression were 618, the sector location for that bulge or depression would be 77. Sector location storage is via a memory buffer the size of which is the same as the number of possible sectors. The location of a buffer word is representative of a sector location and the contents of the buffer word are coded as to whether that sector has a bulge and/or depression that exceeds limits or not for purposes of selective marking.

After the first path data is evaluated a check is made to see if the sensors are positioned at the second path position (DB5). When they are in position, a check is made to see if the SIC is in the marking mode (DB5A) and if not, the waiting for an index timer transition (DB6) is skipped to save time. If the SIC is in a marking mode, a check is made for a transition of the index timer (DB6) which indicates that the tire is at the same rotational position as it was at the start of the first path test. The SIC now takes time based data from the sensors as previously described for the first path and stores it in memory for later analysis. After the data is stored, the servo controller is told to position the sensors at the retract position. While the sensors are being retracted, the second path data (both top and bottom) is evaluated for bulges and depressions that exceed limits and the sector location numbers for same computed and saved for later marking (DB7, DB8 and DB8A) as previously described for the first path. DB9 is utilized to determine whether location marking is required. If no marking is required, the SIC communicates test results to the Host Controller which handles the future disposition of the tire and the SIC returns to the start of the flow chart where it is waiting for a test command from the Host Controller. If marking is required, the marker atomizing air is turned on in preparation for marking and a check is made (DB10) for a transition of the index timer which would indicate that the tire is at the same rotational position as it was at the start of both the first and second path tests. The system would now delay for a fixed period of time to compensate for the angular mounting location differences between the SIC sensors and the marker. This allows the rotational position on the tire that was at the sensors at the start of both tests to be positioned at the marker.

At this point, the tire rotational position at the marker is coincident with the first marking sector buffer location. Its contents are now examined in conjunction with the marking mode (mark bulges, depressions or both) to determine if this sector requires marking (DB11); if it does, the marker cylinder is air activated to allow pressurized ink to flow out of the marker which in conjunction with the atomizing air previously turned on results in atomized ink applied to the tire. The cylinder air remains on for the time duration that it takes the tire to rotate one marking sector, this is shown in the flow chart after DB11. This delay is required whether the current sector is being marked or not to allow the tire to rotate to the next sector for additional marking checks. It happens that in the exemplary embodiment, the delay of one marking sector is adequate to activate the mechanics of the marker system, but if it were not, software or hardware provisions would have to be made to accommodate an optimal activation time—this should not be a problem for one familiar with the art. The actual sector delay in the exemplary embodiment is comprised of a software timer. After the sector delay, the marker cylinder air is turned off and a check is made to see if all the marking sector buffers have been checked (DB12); if they have not, the loop comprising DB11 and DB12 is iterated until they are, at which time the atomizing air is turned off and test results are communicated to the Host Controller which handles the future disposition of the tire after which the SIC returns to the start of the flow chart.

It will be apparent to those skilled in the art that various modifications and additions may be made in the instant invention without departing from the essential features thereof, which are intended to be defined and secured by the appended claims.

I claim:

1. A method for marking the angular location of an irregularity on a tire in response to a tire irregularity detection means that is adapted to detect irregularities in a rotating tire and provide an output signal indicative thereof, wherein said tire is rotating at a constant speed and a random index reference indicative of one rotation of the tire is generated, and a marker angularly displaced from said detection means is employed to mark the tire, comprising the steps of:
   (a) establishing the index reference;
   (b) waiting for the index reference;
   (c) delaying a fixed amount of time to compensate for the angular displacement between the detection means and the marker;
   (d) delaying the time difference between the time that the random index reference was sensed and the time that the irregularity was sensed; and (e) non-contact marking of the tire in response to the sensing of the irregularity while the tire is rotating at the constant speed.

2. A method for marking the angular location of an irregularity on a tire including the steps of:
    (a) rotating the tire at a constant predetermined speed;
    (b) generating an index signal for each revolution of said tire;
    (c) detecting the presence and angular location of an irregularity in said rotating tire;
    (d) generating a signal in response to the presence and angular location of said irregularity; and
    (e) marking the angular location of said irregularity on the tire as the tire is rotating at said constant speed without contacting the tire.

3. The method defined in claim 2 in which an atomized fluid is sprayed onto the rotating tire to mark the angular location of the irregularity.

4. The method defined in claim 2 in which the tire is rotated at sixty revolutions per second.

5. The method defined in claim 2 in which the angular location of any irregulaties are detected along at least two circular test paths on each sidewall area of the tire.

6. The method defined in claim 5 in which the angular location of an irregularity measured along any of the test paths is marked on only one sidewall area of the tire.

7. The method defined in claim 2 including the steps of introducing a first time delay to compensate for any angular displacement between an irregularity detection means and a marking means, and introducing a second time delay to compensate for any time difference between the generations of the index signal and irregularity detection means.

8. An apparatus for marking a rotating tire in proximity to the angular position of an irregularity in said tire including:
    (a) means for rotating the tire at a predetermined constant speed;
    (b) irregularity detection means for detecting the presence and angular location of an irregularity in said rotating tire and for generating an output signal indicative of the angular position of said irregularity;
    (c) means for generating an index signal for each revolution of said tire;
    (d) means using the index signal and output signal from the irregularity detection means for determining the angular location of said irregularity and for generating a marking signal indicative thereof; and
    (e) non-contact marking means responsive to said marking signal for marking the angular location of said irregularity on the tire as the tire is rotated at said constant speed.

9. The apparatus of claim 8 wherein said non-contact marking means is comprised of an atomizing spray marker having a separate means for allowing marking fluid to flow through said marking means and for atomizing said marking fluid.

10. The apparatus of claim 9 wherein said marking fluid is provided to said marking means under pressure and said marking fluid is circulated through that marking means.

11. The apparatus defined in claim 8 in which the tire rotation means is a synchronous motor.

12. The apparatus defined in claim 8 in which the tire is rotated at 60 revolutions per minute.

13. The apparatus defined in claim 8 in which the irregularity detection means is angularly displaced a predetermined distance from the marking means.

14. The apparatus defined in claim 13 in which the irregularity detection means includes a pair of lasers each positioned adjacent an opposite sidewall area of the tire respectively, and movable in a generally radially direction along the sidewall; and in which said lasers detect irregularity in the rotating tire along at least two circumferential test paths on each sidewall of the tire.

15. The apparatus defined in claim 14 in which the marking means marks the tire on only one sidewall area of said tire indicating the angular position of the irregularities in either sidewall area.

* * * * *